(12) United States Patent
Tsai et al.

(10) Patent No.: US 7,821,494 B2
(45) Date of Patent: Oct. 26, 2010

(54) INERTIAL MOUSE

(75) Inventors: Ming-Jye Tsai, Zhubei (TW);
Shun-Nan Liou, Kaohsiung (TW);
Ren-Yuan Yu, Hsinchu (TW); Chin-Lin Hsieh, Banqiao (TW); Shyang-Jye Chang, Xindian (TW); Hsiang-Yu Huang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 593 days.

(21) Appl. No.: 11/189,861

(22) Filed: Jul. 27, 2005

(65) Prior Publication Data

US 2006/0256085 A1    Nov. 16, 2006

(30) Foreign Application Priority Data

May 13, 2005    (TW) ............................... 94115697 A

(51) Int. Cl.
*G09G 5/08* (2006.01)
(52) U.S. Cl. ...................................... 345/158; 345/157
(58) Field of Classification Search ................. 345/156, 345/158, 163–166
See application file for complete search history.

(56) References Cited

U.S. PATENT DOCUMENTS

| | | | | |
|---|---|---|---|---|
| 4,787,051 A | * | 11/1988 | Olson ........................... | 345/179 |
| 5,128,671 A | * | 7/1992 | Thomas, Jr. ................... | 341/20 |
| 5,506,605 A | * | 4/1996 | Paley ........................... | 345/163 |
| 5,825,350 A | | 10/1998 | Case, Jr. et al. ............. | 345/163 |
| 5,874,941 A | * | 2/1999 | Yamada ........................ | 345/157 |
| 5,898,421 A | | 4/1999 | Quinn .......................... | 345/156 |
| 6,342,878 B1 | * | 1/2002 | Chevassus et al. ........... | 345/158 |

FOREIGN PATENT DOCUMENTS

| | | |
|---|---|---|
| CN | 2005 1 0105568.0 | 5/2008 |
| JP | 4061322 | 12/2007 |
| KR | 10 0739980 | 7/2007 |

OTHER PUBLICATIONS

Industrial Technology Research Institute, "Technology Transfer and License Agreement" May 26, 2010, Taiwan.
CyWee Group Limited, "Cywee commercial catalog", Taiwan.

* cited by examiner

*Primary Examiner*—Alexander Eisen
*Assistant Examiner*—Stuart McCommas
(74) *Attorney, Agent, or Firm*—WPAT, PC; Justin King

(57) ABSTRACT

An inertial mouse is disclosed in the invention, comprising: a housing; a first inertial part, coupled to a circuit substrate received in the housing, for detecting a motion measured with respect to a second axis and a third axis of a space and also for detecting a motion measured along a first axis of a plane; a second inertial part, coupled to the circuit substrate, for detecting a motion measured with respect to a first axis of the space and also for optionally detecting a motion measured along a second axis of the plane; and a micro-controller, coupled to the circuit substrate, capable of converting electrical signals received from the first and the second inertial parts or cells into a displacement signal while transmitting the displacement signal to an electronic display device by a means of transmission.

12 Claims, 5 Drawing Sheets

INERTIAL MOUSE

FIELD OF THE INVENTION

The present invention relates to a hand-held input device for computers, and more particularly, to an inertial mouse capable of sensing and measuring the variation of acceleration while employing the results of the sensing/measuring as the detection of an inertial of the movement of a hand holding the inertial mouse and as the measurement of the rotation or translation of movement.

BACKGROUND OF THE INVENTION

Currently, there are many kinds of computer mouse available on the market, which are the most popular human-machine interface used by computers as cursor-control device. There are three basic types of mice, which are mechanical mouse, LED optical mouse and laser mouse with respect to the different means of detection. A typical mechanical mouse comprises a chassis containing a ball, with a part of the ball protruding through the underside of the chassis. When an user moves the mouse about on a flat surface, the ball rotates which is detected by the sensors arranged in the chassis. Unfortunately the moving parts of such a mouse can become dirty, causing the sensors to incorrectly measure ball rotation. A typical LED optical mouse has a small, red light-emitting diode (LED) that bounces light off that surface with sufficient roughness onto a complimentary metal-oxide semiconductor (CMOS) sensor. The CMOS sensor sends each image to a digital signal processor (DSP) for analysis, that the DSP is able to detect patterns of shadows generated by the roughness of the surface in the images and see how those patterns have moved since the previous image. Based on the change in patterns over a sequence of images, the DSP determines how far the mouse has moved and sends the corresponding coordinates to the computer. However, if the working surface of the LED optical mouse is a smooth surface made of marble, tile, or metal, etc., such mouse might not be able to operate without a hitch. A laser mouse is an advanced optical mouse, which is capable of emitting a coherent light so as to detect more surface pattern variation than the standard LED based optical mice. Nevertheless, such laser mice are not able to operate fluently while working on a transparent surface made of glass, acrylic, and so on.

In 1995, an input device is disclosed in U.S. Pat. No. 5,898,421, entitled "Gyroscopic Pointer and Method", by Gyration Inc., which is a hand-held input device having an inertial gyroscopic element arranged therein, capable of being used either in free space, employing the inertial gyroscopic element for detecting angular velocity of a user's hand and thus defining movements of a cursor displayed on a screen of an interactive computer, or while sitting on a surface, employing either an optical element or moving part for detecting movement of a user's hand. An inertial mouse generated by the Gyration Inc. with respect to the referring patent is already available on the market, which is acting as a common LED optical mouse while it is sitting on a surface, and is acting as an inertial mouse using the inertial gyroscopic element to detect the angular velocity of rotation while it is operating in free space. Since the aforesaid mouse can be considered as a standard LED optical mouse with addition gyroscope arranged therein, it is conceivable that the cost of the referring mouse is comparably higher. Moreover, the pricey gyroscope further restricts the popularity of the inertial mouse, that is, the average price of a high-end mouse currently available on the market is about US$ 40.00 while a one-axis gyroscope will already cost about US$30.00. By virtue of this, the price of the "Gyration In-Air Wireless Optical Mouse" produced by the Gyration Inc. is about US$79.00, which is less competitive comparing to the optical mice, both in cost and in price.

In general, the drawbacks of this computer mouse with inertial gyroscopic element can be summing up as following:
(1) Since the aforesaid mouse is implementing optical sensors for detecting how far the mouse moved while operating on a flat surface, it will still has problems of power consumption and tracing capability similar to the typical optical mouse.
(2) Since the aforesaid mouse uses a gyroscope for detecting angular velocity of the mouse while operating in a free space, the use of the pricey gyroscope will cause the cost of the mouse to increase and thus the price of the mouse is too high to be competitive.

Therefore, what is needed and would be useful is an inertial mouse capable of operating functional while sitting on a flat surface and in a free space, which is convenient to use and has high precision in movement detection.

SUMMARY OF THE INVENTION

In view of the disadvantages of prior art, the primary object of the present invention is to provide an inertial mouse, which has a plurality of inertial parts or cells arranged therein in a specific disposition such that the movements of the inertial mouse can be obtained no matter it is moving on a surface or in a free space and thus the movements of a cursor displayed on a screen of an interactive computer corresponding to the inertial mouse can be determined by a differential operation.

It is another object of the invention to provide an inertial mouse, which has a mode switch for controlling the switching of the sensing capabilities of the inertial mouse, that is, the inertial mouse is selected to be in a mode of two-dimensional detection or in a mode of three-dimensional detection by the control of the mode switch.

It is further another object of the invention to provide an inertial mouse having a return switch, by which the plural inertial parts or cells are controlled to activated/deactivated while the inertial mouse in operating in the two-dimensional detection mode for preventing the inertial parts or cells to detect uncalled for movements of the inertial mouse.

To achieve the above objects, the present invention provide an inertial mouse, comprising: a housing; a first inertial part-part, coupled to a circuit substrate received in the housing, for detecting a motion measured with respect to a second axis and a third axis of a space and also for detecting a motion measured along a first axis of a plane; a second inertial partpart, coupled to the circuit substrate, for detecting a motion measured with respect to a first axis of the space and also for optionally detecting a motion measured along a second axis of the plane; and a micro-controller, coupled to the circuit substrate, capable of converting electrical signals received from the first and the second inertial parts or cells into a displacement/rotation signal while transmitting the displacement signal to an electronic display device by a means of transmission.

In a preferred embodiment of the invention, the first inertial part further comprises: a first accelerometer, coupled to the micro-controller, for detecting the acceleration measured along the first axis of the plane and the acceleration measured along the first axis of the space; and an auxiliary accelerometer, coupled to the micro-controller while being positioned apart from the first accelerometer by a distance, for detecting the acceleration measured along the first axis of the space;

wherein the micro-controller receives and processes the accelerations from the first accelerometer and the auxiliary accelerometer by a differential operation so as to acquire an angular movement corresponding to the third axis of the space. In addition, the first accelerometer is capable of detecting the rotation measured along the second axis of the space.

In another preferred embodiment of the invention, the second inertial part further comprises a second accelerometer, coupled to the micro-controller, for detecting the acceleration measured along the second axis of the plane and the rotation measured along the first axis of the space.

Preferably, the inertial mouse further comprises a mode switch, coupled to the circuit substrate, for controlling the micro-controller to perform an operation selected from the group consisting of a calculation of two-dimensional displacement and a calculation of three-dimensional displacement.

Moreover, the inertial mouse further comprises a return switch, coupled to the circuit substrate, for controlling the micro-controller to proceed with a process selected from the group consisting of stopping the calculation of two-dimensional displacement and proceeding with the calculation of two-dimensional displacement, while the micro-controller is controlled to perform the calculation of two-dimensional displacement.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
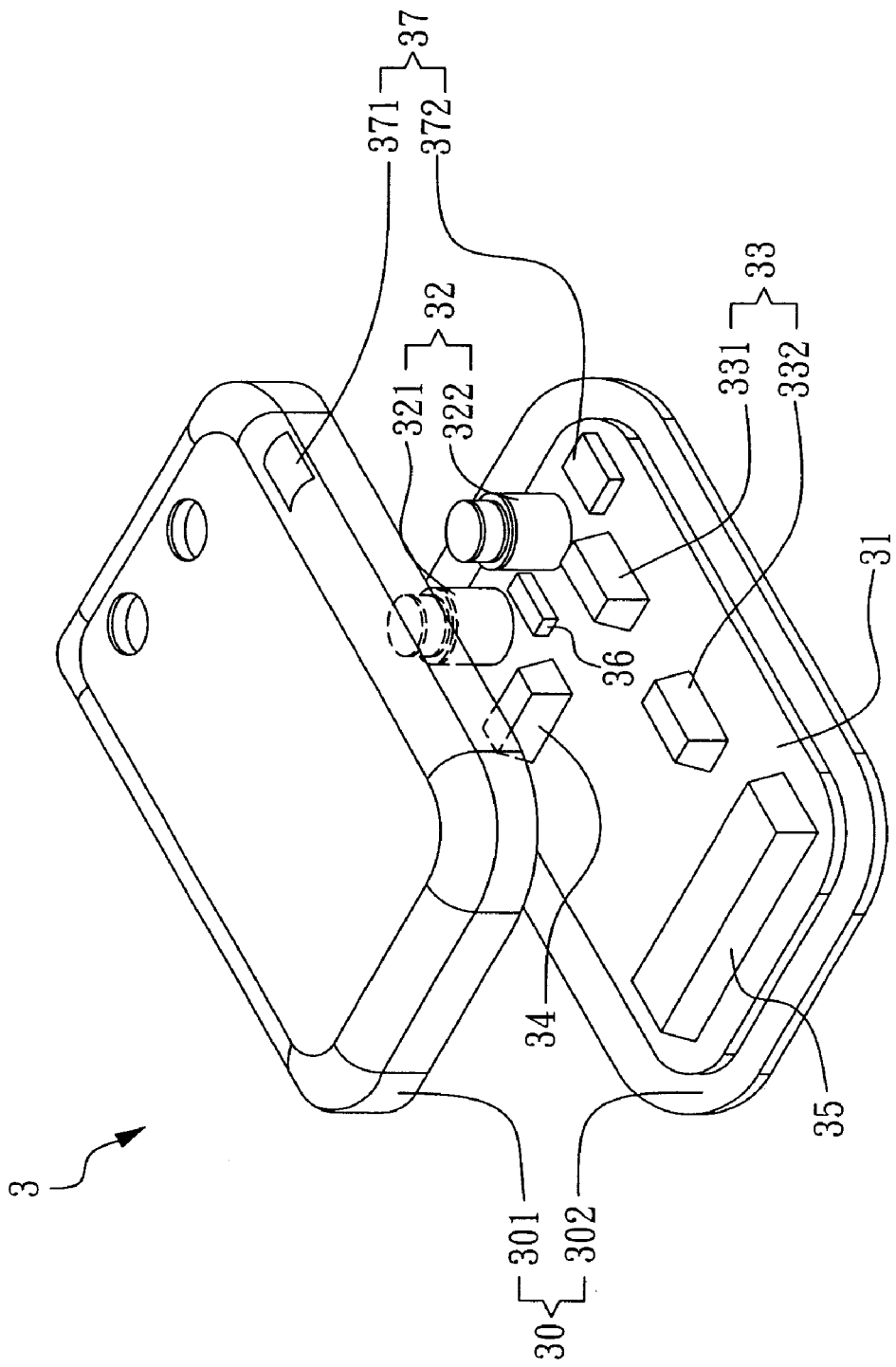
FIG. 1A is a schematic view showing the assembly of an inertial mouse according to a preferred embodiment of the invention.

Please refer to FIG. 1A, which is a schematic view showing the assembly of an inertial mouse according to a preferred embodiment of the invention. As seen in FIG. 1A, the inertial mouse 3 of the invention comprises: a housing 30, composed of top casing 301 and a bottom casing 302; a circuit substrate 31, received in the housing 30; a key set 32; a first inertial part 33; a second inertial part 34; a micro-controller 35; a wireless transmission module 36; a mode switch 37; and a return switch 38 (not shown in the figure).

The first inertial part 33, being coupled to a circuit substrate 35, is used for detecting a motion measured with respect to a second axis and a third axis of a space and also for detecting a motion measured along a first axis of a plane. In a preferred embodiment of the invention, the first inertial part 33 further comprises: a first accelerometer 331, coupled to the micro-controller 35, for detecting the acceleration measured along the first axis of the plane and the acceleration measured along the first axis of the space; and an auxiliary accelerometer 332, coupled to the micro-controller 35 while being positioned apart from the first accelerometer 331 by a distance, for detecting the acceleration measured along the first axis of the space.

The second inertial part 34, being coupled to the circuit substrate 31, is used for detecting a motion measured with respect to a first axis of the space and also for detecting a motion measured along a second axis of the plane. In the aforesaid preferred embodiment of the invention, the second inertial part 34 further comprises; a second accelerometer, coupled to the micro-controller 35, for detecting the acceleration measured along the second axis of the plane and the rotation measured along the first axis of the space.

The key set 32 including a left button 321 and a right button 322, which are used as input interfaces. The micro-controller 35, being coupled to the circuit substrate 31, is capable of converting electrical signals received from the first and the second inertial parts or cells 33, 34 into a displacement signal while transmitting the displacement signal to an electronic display device by a means of transmission. In the aforesaid preferred embodiment of the invention, the electronic display device can be a television set, a multimedia device, or a computer and the like. In addition, the means of transmission includes a wired transmission method and a wireless transmission method.

The mode switch 37, comprising a switch control 372 coupled to the circuit substrate 31, and a control button 371 electrically connected to the switch control 372, is used for or controlling the micro-controller 35 to perform an operation selected from the group consisting of a calculation of two-dimensional displacement and a calculation of three-dimensional displacement, that is, the inertial mouse 3 can be controlled and selected to be in a mode of two-dimensional detection or in a mode of three-dimensional detection by the switch of the mode switch 37. By virtue of this, when the mode switch 37 controls the micro-controller 35 to perform the calculation of two-dimensional displacement, i.e. the inertial mouse 3 is in the two-dimension detection mode, the first inertial part 33 is used for detecting a motion measured along the first axis of the plane, and the second inertial part 34 is used for detecting a motion measured along the second axis of the plane, being orientated orthogonal to the first axis; and when the mode switch 37 controls the micro-controller 35 to perform the calculation of three-dimensional displacement, i.e. the inertial mouse 3 is in the three-dimension detection mode, the first inertial part 33 is used for detecting the rotations measured along the second and the third axis of the space, and the second inertial part 34 is used for detecting the rotation measured along the first axis of the space.

Figure 1B:
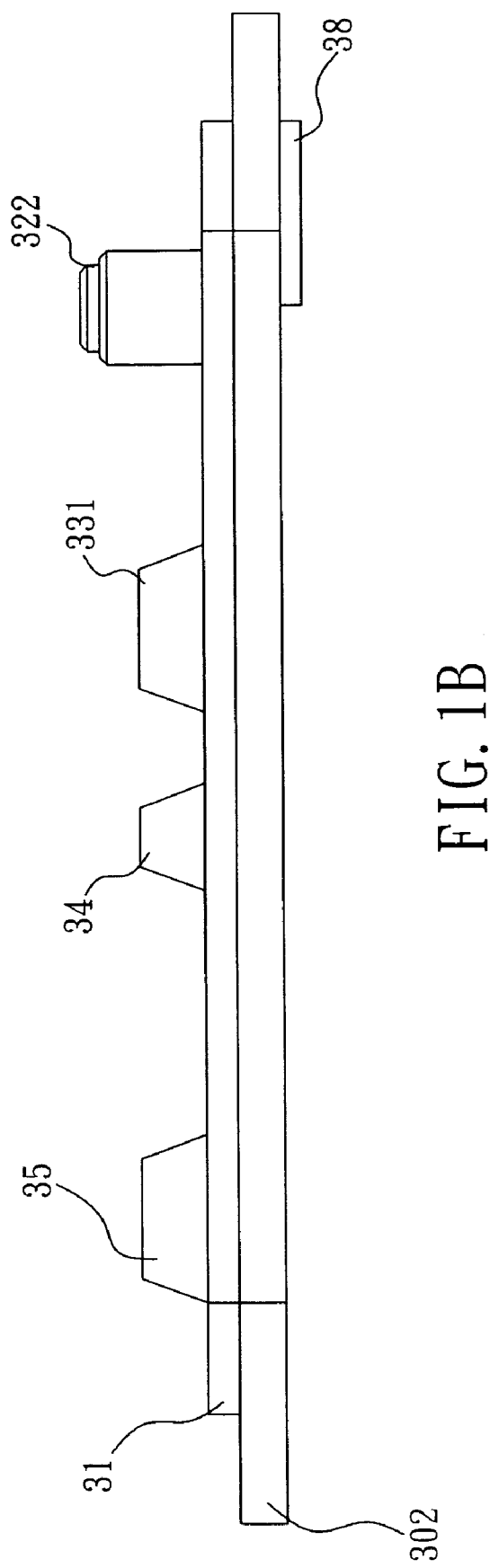
FIG. 1B is a side view of an inertial mouse of the invention.

Please refer to FIG. 1B, which is a side view of an inertial mouse of the invention. In FIG. 1B, the inertial mouse 3 further comprising a return switch 38, which is arranged at the bottom of the bottom casing 302 while electrically connected to the circuit substrate 31, and is used for controlling the micro-controller 35 to proceed with a process selected from the group consisting of stopping the calculation of two-dimensional displacement and proceeding with the calculation of two-dimensional displacement, while the inertial mouse 3 is in the two-dimension detection mode. That is, the return switch 38 disposed at the bottom of the inertial mouse 3 is blocked from ejection when the mouse 3 is sitting on a surface and is in the two-dimension detection mode, such that the blocked return switch 38 enables the micro-controller 35 to proceed with the calculation of two-dimensional displacement. However, it is common for a user to lift the inertial mouse 3 from the surface and place the inertial mouse 3 to another position on the surface which is convenient for the next operation. Under the circumstance, in order to prevent the first and the second inertial parts or cells 33, 34 to detect any uncalled for movement of he inertial mouse 3 when it is being lifted in the air, the return switch 38 is ejected since it is not block by the surface so that the micro-controller 35 is controlled to proceed with a process of stopping the calculation of two-dimensional displacement. Therefore, a cursor displayed on a screen of an interactive computer can remain stationary when the inertial mouse 3 is being lifted in the air.

Figure 2:
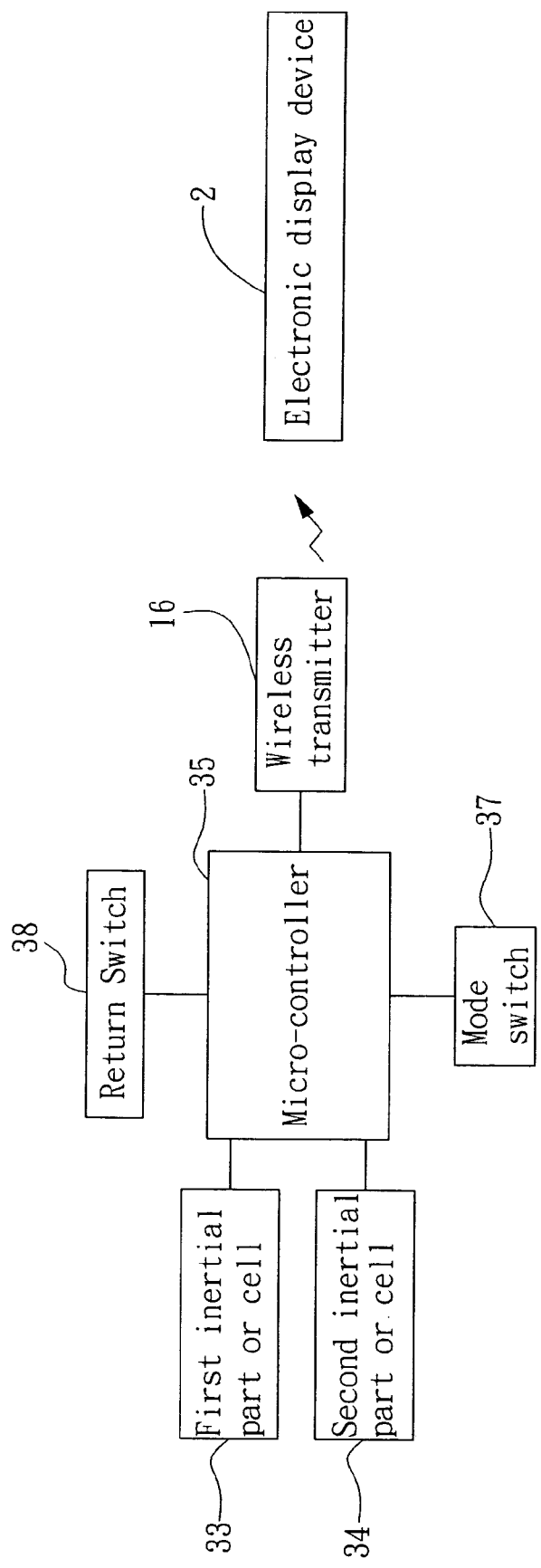
FIG. 2 is a block diagram showing an inertial mouse according to a preferred embodiment of the invention.
Figure 3:
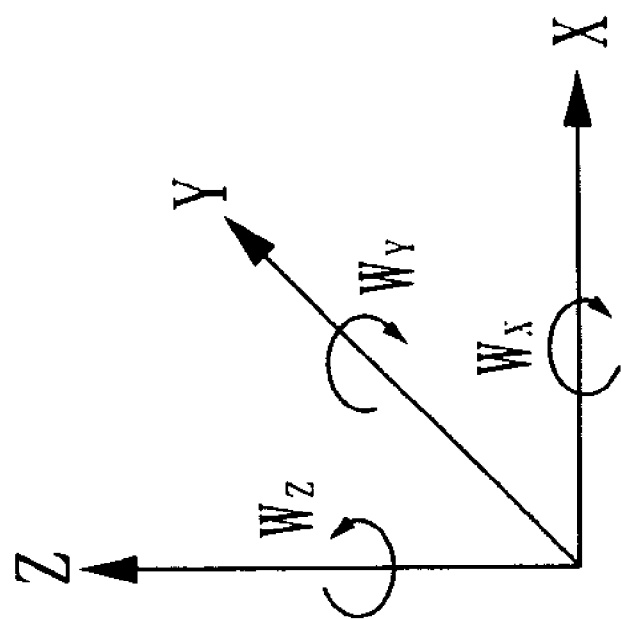
FIG. 3 is a 3-D Cartesian coordinates defining three angular velocities respectively for each coordinate, i.e. Wx, Wy, and Wz.

Please refer to FIG. 2 and FIG. 3, which respectively is a block diagram showing an inertial mouse and is a 3-D Cartesian coordinates of X, Y, Z axes defining three angular velocities, i.e. Wx, Wy, and Wz. When the inertial mouse 3 is in the two-dimension detection mode controller by the mode switch 37, the first accelerometer 331 of the first inertial part 33 can detect the acceleration of the inertial mouse 3 measured along the first axis of the plane, i.e. the X axis, and the second accelerometer of the second inertial part 34 can detect the acceleration of the inertial mouse 3 measured along the second axis of the plane, i.e. the Y axis. Thereafter, the micro-controller 35 receives the signals of acceleration detected by the first and the second inertial parts or cells 33, 34 and then processes the received signals by a integral operation so as to generate a displacement signal, that the displacement signal is further being transmitted to the electronic display device 2 by the wireless transmitter 16.

Referring to FIG. 3, when the inertial mouse 3 is in the three-dimension detection mode controller by the mode switch 37, the second inertial part 34 can detect the rotation of the inertial mouse 3 measured along the first axis of the space, which is addressed as Wx of FIG. 3, while the micro-controller 35 receives and processes the detected acceleration variation so as to calculate a pitch angle employed as input for controlling the cursor to move up/down the electronic display device 2, which is being transmitted to the electronic display device 2 by the wireless transmitter 16.

Figure 4:
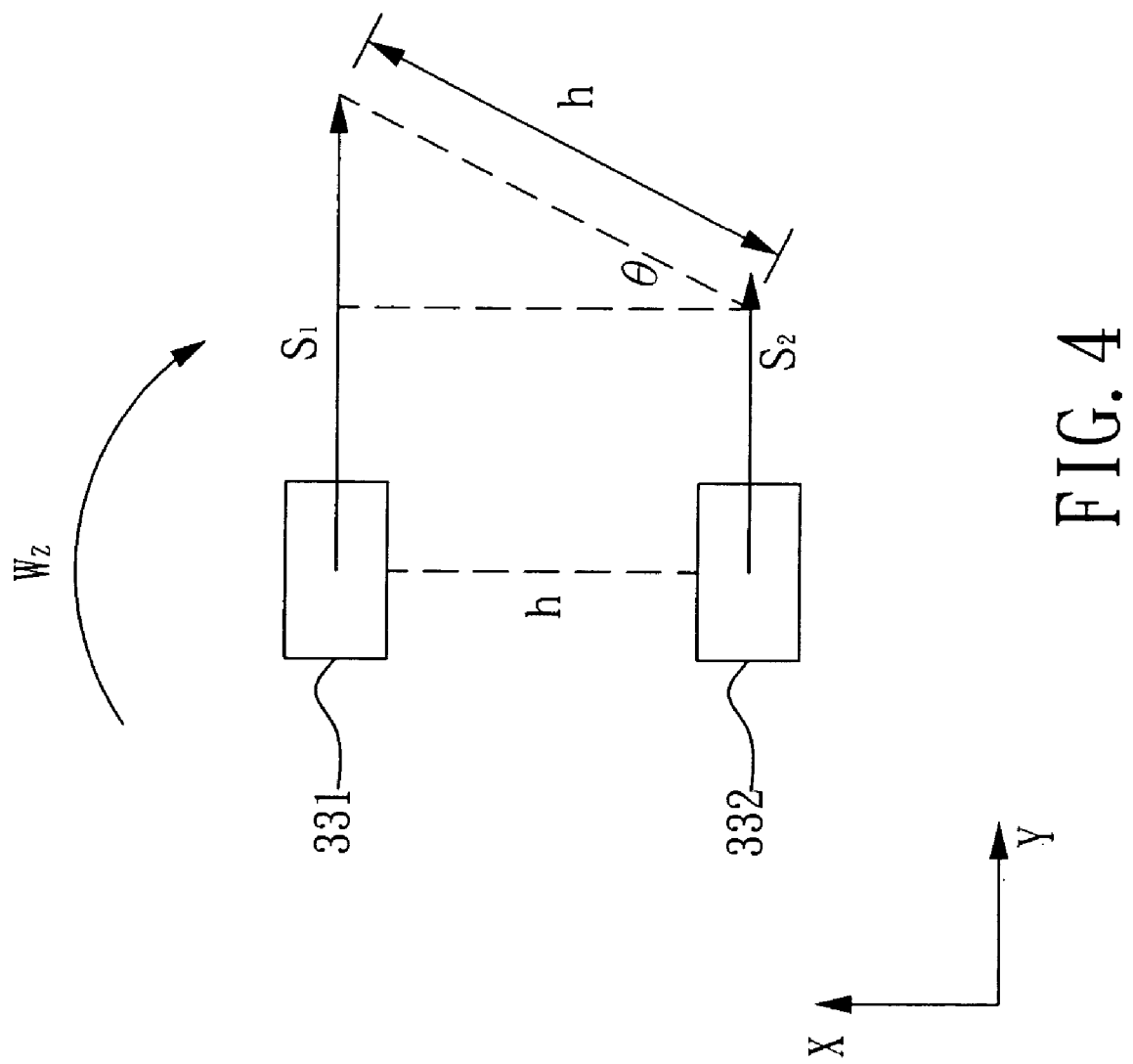
FIG. 4 is a schematic diagram showing the detection of angular movement measured along the third axis of the space according to a preferred embodiment of the invention.

Please refer to FIG. 4, which a schematic diagram showing the detection of angular movement measured along the third axis of the space according to a preferred embodiment of the invention. As seen in FIG. 4, By integrating the variations of acceleration measured along the X axis respectively by the first accelerometer 331 and the auxiliary accelerometer 332, the displacements $S_1$, $S_2$ can be acquired. According to the difference between the displacements $S_1$, $S_2$ and the distance h between the first accelerometer 331 and the auxiliary accelerometer 332, the angular variation θ measured corresponding to the Z axis can be acquired, which is used as input for controlling the cursor to move left/right the electronic display device 2 and is being transmitted to the electronic display device 2 by the wireless transmitter 16.

In FIG. 3, the first accelerometer 331 of the first inertial part 33 also can be used for detecting the rotation Wy measured along the second axis (i.e. the Y axis of FIG. 3) of the space while the detection being further transmitted to the micro-controller 35 to be processed so as to acquire an angular variation, which is being employed as input for controlling the cursor and is being transmitted to the electronic display device 2 by the wireless transmitter 16.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An inertial mouse, comprising:
a housing;
a circuit substrate enclosed within the housing;
a first accelerometer, coupled to a micro-controller and the circuit substrate, for measuring a first linear movement along a first axis and for measuring a first rotational movement around a second axis, and transmitting information corresponding to said measured first linear movement and said measured first rotational movement to the micro-controller;
an auxiliary accelerometer, coupled to the micro-controller and the circuit substrate, for measuring a second linear movement along the first axis, wherein said auxiliary accelerometer is distanced away from said first accelerometer by a first distance, and transmitting information corresponding to said measured second linear movement to the micro-controller;
a second accelerometer, coupled to the micro-controller and the circuit substrate, for measuring a third linear movement along said second axis and for measuring a second rotational movement around said first axis, and transmitting information corresponding to said measured third linear movement and said measured second rotational movement to the micro-controller; and
the micro-controller, coupled to the circuit substrate, for calculating a rotational movement value reflecting movement on around a third axis based on the magnitude of said first linear movement, the magnitude of said second linear movement, and the magnitude of said first distance, and transmitting said rotational movement value to an electronic device to effect movement of a display cursor.

2. The inertial mouse of claim 1,
wherein said micro-controller transmits a wired signal to an electronic display device.

3. The inertial mouse of claim 1,
wherein said micro-controller transmits a wireless signal to an electronic display device.

4. The inertial mouse of claim 1,
further comprising a mode switch, coupled to the circuit substrate, for controlling the micro-controller to perform an operation selected from the group consisting of a two-dimensional displacement calculation and a three-dimensional displacement calculation.

5. The inertial mouse of claim 4,
wherein the first accelerometer detects said first linear movement along the first axis in said two-dimensional displacement calculation.

6. The inertial mouse of claim 4,
wherein the second accelerometer detects said third linear movement along the second axis in said two-dimensional displacement calculation.

7. The inertial mouse of claim 4,
wherein the first accelerometer and said auxiliary accelerometer effect determination of said rotational movement around the third axis in the three-dimensional displacement calculation.

8. The inertial mouse of claim 4,
wherein the second accelerometer detects said first rotation movement around the first axis in said three-dimensional displacement calculation.

9. The inertial mouse of claim 4,
wherein the first accelerometer detects said second rotational movement around the second axis in said three-dimensional displacement calculation.

10. The inertial mouse of claim 4, wherein the mode switch further comprising:
a switch control, coupled to the micro-controller; and
a control button, electrically connected to the switch control.

11. The inertial mouse of claim 4,
further comprising a return switch, coupled to the circuit substrate, for controlling the micro-controller to proceed with a process selected from the group consisting of deactivating the calculation of two-dimensional displacement and activating the calculation of two-dimensional displacement, while the micro-controller is controlled to perform the calculation of two-dimensional displacement.

12. The inertial mouse of claim 11,
wherein the return switch is arranged at the bottom of the housing while electrically connected to the circuit substrate.

* * * * *